United States Patent
Stanikowski

(10) Patent No.: US 11,744,279 B2
(45) Date of Patent: Sep. 5, 2023

(54) FEEDING APPARATUS FOR FEEDING SINGLE-LAYER STREAM OF TOBACCO INDUSTRY'S ROD-LIKE ARTICLES

(71) Applicant: International Tobacco Machinery Poland Sp. z o. o., Radom (PL)

(72) Inventor: Robert Stanikowski, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 728 days.

(21) Appl. No.: 16/946,814

(22) Filed: Jul. 8, 2020

(65) Prior Publication Data
US 2021/0037879 A1 Feb. 11, 2021

(30) Foreign Application Priority Data
Aug. 5, 2019 (EP) .................................... 19190093

(51) Int. Cl.
*A24C 5/32* (2006.01)
*B65B 35/44* (2006.01)
(Continued)

(52) U.S. Cl.
CPC .............. *A24C 5/327* (2013.01); *A24C 5/325* (2013.01); *A24C 5/328* (2013.01); *B65B 19/105* (2013.01);
(Continued)

(58) Field of Classification Search
CPC ...... B65G 47/18; B65G 47/19; B65G 47/846; B65G 2201/0226; B65G 47/26;
(Continued)

(56) References Cited

U.S. PATENT DOCUMENTS 4,352,604 A * 10/1982 Carascon ........... B65G 47/5104
406/28
4,368,742 A * 1/1983 Wahle .................... A24C 5/323
131/88

(Continued)

FOREIGN PATENT DOCUMENTS

DE 404241 C 10/1924
DE 102004024587 A1 12/2005
(Continued)

OTHER PUBLICATIONS

European Search Report in application No. EP19190093.5, dated Jan. 24, 2020.

*Primary Examiner* — Mark A Deuble
(74) *Attorney, Agent, or Firm* — Oppedahl Patent Law Firm LLC

(57) ABSTRACT

The object of the invention is a feeding apparatus for feeding a single-layer stream of tobacco industry's rod-like articles (2) comprising a first feeding channel (10) adapted to convey the rod-like articles (2) in the form of a mass flow (MF), a second feeding channel (11) provided with a lower conveyor (16), adapted to convey the rod-like articles (2) in the form of the mass flow (MF), whereas the second feeding channel (11) is flow-connected with the first feeding channel (10), a storage container (3) adapted to filling with the rod-like articles (2), flow-connected with the second feeding channel (11), an outlet conveyor (5, 30) provided with a bearing surface (5A, 30A) comprising grooves (23, 31), adapted to take the rod-like articles (2) from the storage container (3) and convey the rod-like articles (2) in the form of a single-layer stream (SF) of rod-like articles (2), characterised in that the bottom of the storage container (3) is formed by the lower conveyor (16) of the second feeding channel (11) and the bearing surface (5A, 30A) of the outlet conveyor (5, 30), and that the second feeding channel (11)

(Continued)

is provided with an upper drive element (17, 33) for the mass flow (MF) comprising a bearing surface (17A, 33A) which is at least partially situated convergently to the bearing surface (16A) of the lower conveyor (16) of the second feeding channel (11) in the direction from the first feeding channel (10) to the storage container (3).

17 Claims, 5 Drawing Sheets

(51) Int. Cl.
  *B65G 47/19* (2006.01)
  *B65G 47/84* (2006.01)
  *B65B 19/10* (2006.01)
  *B65G 47/18* (2006.01)

(52) U.S. Cl.
  CPC ............ *B65B 35/44* (2013.01); *B65G 47/18* (2013.01); *B65G 47/19* (2013.01); *B65G 47/846* (2013.01); *B65G 2201/0226* (2013.01)

(58) Field of Classification Search
  CPC ......... B65G 19/10; A24C 5/325; A24C 5/327; A24C 5/328; B65B 19/04; B65B 19/105; B65B 35/44; B65B 35/46
  See application file for complete search history.

(56) References Cited

U.S. PATENT DOCUMENTS

| | | | | |
|---|---|---|---|---|
| 4,420,073 | A |  | 12/1983 | Haeusler |
| 4,580,939 | A | * | 4/1986 | Dyett .................... A24D 3/0258 414/327 |
| 5,318,201 | A | * | 6/1994 | Lowe ..................... A24C 5/325 221/281 |
| 5,407,053 | A | * | 4/1995 | Suzuki ................... A24C 5/323 198/493 |
| 7,328,783 | B2 | * | 2/2008 | Ferrari ..................... A24C 5/35 198/572 |

FOREIGN PATENT DOCUMENTS

| | | |
|---|---|---|
| EP | 0594208 B1 | 9/1997 |
| GB | 1584551 A | 2/1981 |

* cited by examiner

FEEDING APPARATUS FOR FEEDING SINGLE-LAYER STREAM OF TOBACCO INDUSTRY'S ROD-LIKE ARTICLES

BACKGROUND

Tobacco industry's products and semi-finished products such as finished cigarettes, cigarillos, tobacco rods, filter rods are sent among operating stations and temporarily stored in various storage containers within such stations. In commonly used machines it is required that the rod-like articles are fed in a single-layer stream on a drum or belt conveyor to which the rod-like articles are supplied from the storage container. Very important requirements put by the manufacturers of tobacco products include the need to adapt such conveyors and storage containers supplying them to a wide output range, and in addition the need to consider a great variability of the articles' wrapping material friction coefficient, which has a great influence on the displacement of articles relative to one another in the storage container and on the effectiveness of filling of the conveyors' grooves. The production practice indicates that the effectiveness of the apparatus comprising a feeding device, a storage container and a drum conveyor provided with grooves or a belt conveyor provided with grooves depends on the maintenance of a constant level of the articles in the storage container. A too high container filling level generates too great pressures among the articles and may hinder the filing of the conveyor grooves or may result in damage to the articles. A too low filling level entails the risk that not all grooves will be filled, and may also involve flow disturbances in the storage container, which usually results in damage to the articles.

Apparatuses forming a single-layer stream of rod-like articles transported in conveyor grooves are known from the prior art. The patent DE404241C shows an apparatus comprising a storage container for rod-like articles, an intermediate store and a drum conveyor in whose grooves the single-layer article stream is formed. The drum conveyor feeds the stream of rod-like articles to a receiving apparatus. The patent U.S. Pat. No. 4,020,973A discloses an apparatus forming a single-layer stream of rod-like articles comprising a storage container for rod-like articles whose bottom is constituted by the bearing surface of the drum conveyor and the bearing surface of the belt conveyor which feeds the rod-like articles towards the drum conveyor. Similarly operating apparatuses were disclosed in the application DE102004024587A1 and in the patent EP0594208B1.

Document GB1584551A discloses an apparatus and method for feeding a single-layer stream of tobacco industry's rod-like articles, where a stack-like stream of rod-like articles is conveyed upwards by an elevator to an overhead conveyor. Said conveyor carries the stack-like stream of the rod-like articles to a junction from which articles can either pass downwards through a chute into an intermediate hopper or into a reservoir with a reversible conveyor.

SUMMARY OF THE INVENTION

The object of the invention is a feeding apparatus for feeding a single-layer stream of tobacco industry's rod-like articles comprising a first feeding channel adapted to convey the rod-like articles in the form of a mass flow, a second feeding channel provided with a lower conveyor adapted to convey the rod-like articles in the form of the mass flow, whereas the second feeding channel is flow-connected with the first feeding channel, a storage container adapted to filling with the rod-like articles, flow-connected with the second feeding channel, an outlet conveyor provided with a bearing surface comprising groves, adapted to take the rod-like articles from the storage container and convey the rod-like articles in the form of a single-layer stream of rod-like articles, characterised in that the bottom of the storage container is formed by the lower conveyor of the second feeding channel and the bearing surface of the outlet conveyor, and in that the second feeding channel is provided with an upper drive element for the mass flow comprising a bearing surface which is at least partially situated convergently to the bearing surface of the lower conveyor of the second feeding channel in the direction from the first feeding channel to the storage container.

Preferably, the apparatus according to the invention is characterised in that the inlet width of the second feeding channel at the connection of the first feeding channel and the second feeding channel is equal to or greater than the width of the first feeding channel.

Preferably, the apparatus according to the invention is characterised in that the width of an inlet mouth of the storage container is greater than the inlet width of the second feeding channel or the outlet width of the second feeding channel.

Preferably, the apparatus according to the invention is characterised in that the upper drive element is an upper conveyor having two rollers whose bearing surface is situated at an angle $\alpha$ to the lower conveyor ranging between 0° and 5° so that the outlet width is smaller than or equal to the inlet width of the feeding channel.

Preferably, the apparatus according to the invention is characterised in that the upper drive element is a roller.

Preferably, the apparatus according to the invention is characterised in that the outlet conveyor is a drum conveyor.

Preferably, the apparatus according to the invention is characterised in that the outlet conveyor is a belt or chain conveyor.

Preferably, the apparatus according to the invention is characterised in that the bearing surface of the upper drive element is adapted to move with a speed equal to the speed of the lower conveyor.

Preferably, the apparatus according to the invention is characterised in that the apparatus is provided with a third feeding channel which is flow-connected with the first feeding channel and the first feeding channel and/or the third feeding channel is adapted to convey the rod-like articles under the force of gravity.

Preferably, the apparatus according to the invention is characterised in that the first feeding channel and/or the third feeding channel is adapted to convey the rod-like articles by means of a conveyor.

Preferably, the apparatus according to the invention is characterised in that the connection of the third feeding channel and the first feeding channel is provided with a roller whose circumferential surface constitutes a wall for the mass flow.

Preferably, the apparatus according to the invention is characterised in that the roller on the side of the storage container is adapted to change the position in the transverse direction to the second feeding channel.

Preferably, the apparatus according to the invention is characterised in that the first feeding channel and/or the third feeding channel is provided with a flexible element situated at the wall of that channel.

Preferably, the apparatus according to the invention is characterised in that at the upper drive element on the side of the storage container a covering element is situated.

Preferably, the apparatus according to the invention is characterised by being provided with a sensor adapted to measure the level of storage container filling with the rod-like articles, situated in the upper part of the storage container.

Preferably, the apparatus according to the invention is characterised in that the storage container is provided with a flexible wall adapted to adjust its shape to the shape of the upper layer of the rod-like articles collected in the storage container.

Preferably, the apparatus according to the invention is characterised by being provided with a controller to control the storage container filling level, adjust the mass flow speed in the second feeding channel depending on the filling level and on the outlet conveyor speed, and to determine dependencies between the speeds.

In the feeding apparatus according to the invention, it is possible to keep, during the production, a constant level of filling with the rod-like articles in the storage container independently of the friction coefficient of wrapping material of the rod-like articles being fed relative to such material. The apparatus according to the invention allows changing the storage container filling level so that it is possible to effectively fill the output container grooves independently of the article weight and independently of the wrapping material friction coefficient. Experiments have shown that also in the case of rod-like articles without a wrapping material characterised by a very high friction coefficient a high degree of filling of the output conveyor grooves may be achieved. In addition, complete emptying of the storage container of rod-like articles with a filled feeding apparatus, i.e. without the need to empty the channels of the feeding apparatus, is possible.

BRIEF DESCRIPTION OF THE DRAWING

The object of the invention was shown in detail in a preferred embodiment in a drawing in which.

DETAILED DESCRIPTION

Figure 1:
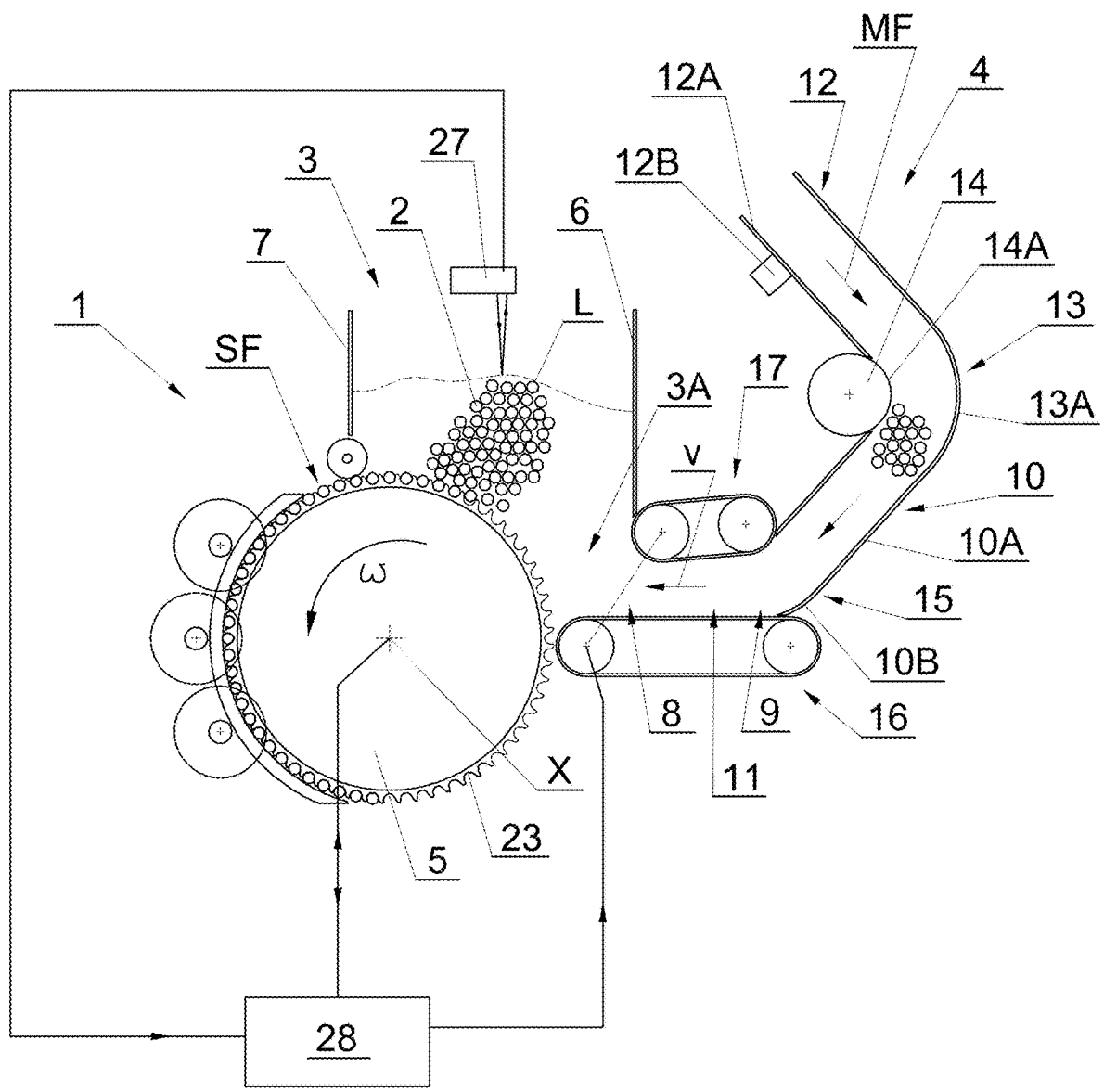
FIG. 1 shows a feeding apparatus in a front view in an embodiment with a drum conveyor.
Figure 2:
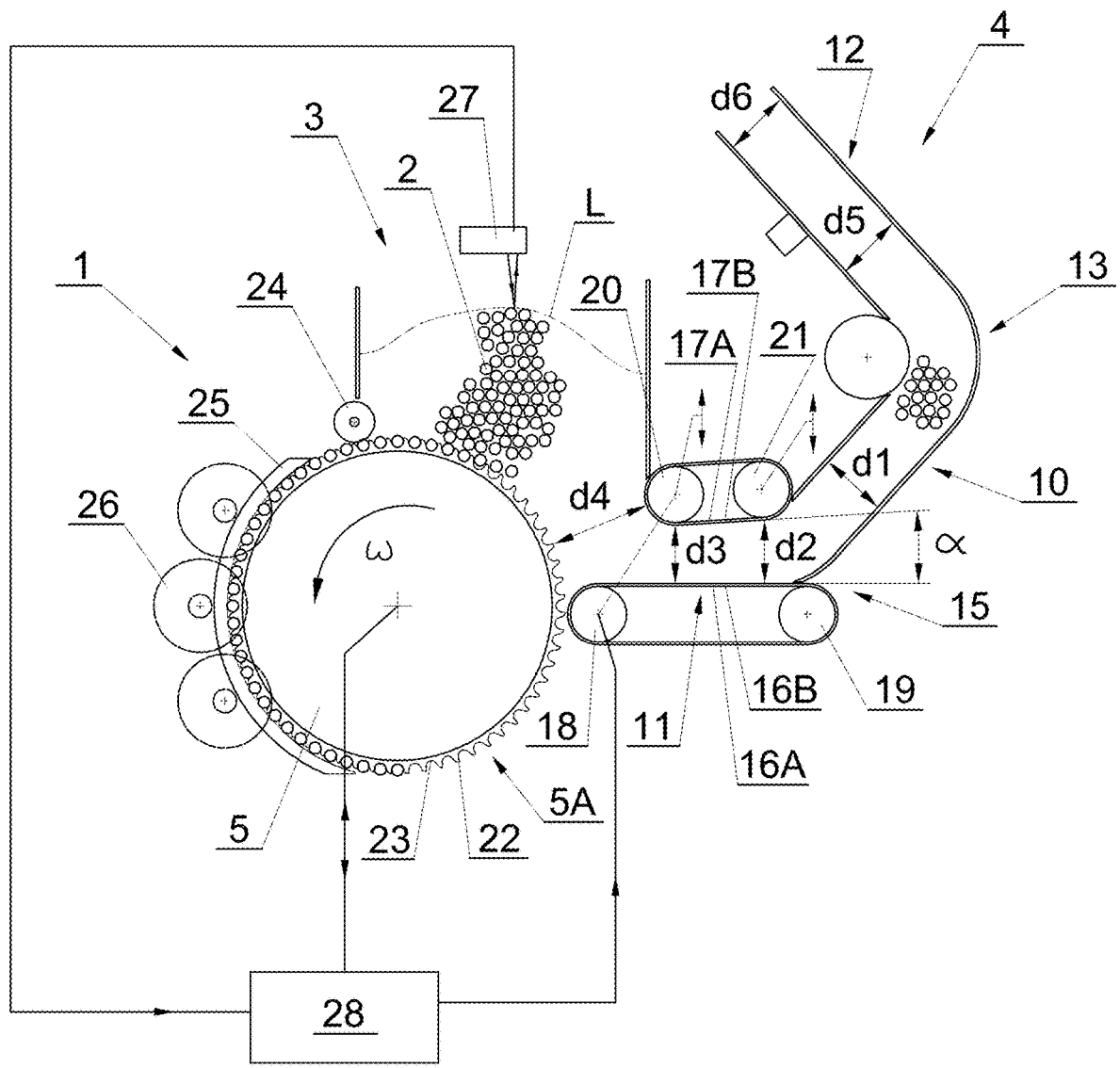
FIG. 2 shows the feeding apparatus in a front view in an embodiment with the drum conveyor.

In the embodiment shown in FIG. 1 and FIG. 2, an apparatus 1 for feeding a single-layer stream of tobacco industry's rod-like articles 2 comprises a storage container 3, a feeding device 4 and a drum conveyor 5 with the axis of rotation X. In the storage container 3 and in the feeding device 4 only a certain amount of rod-like articles 2 was shown. The storage container 3 has two side walls 6, 7 (the front and back walls, which are parallel to the drawing plane, are not shown in the drawing). The feeding device 4 is situated on the side of the first wall 6, whereas the outlet 8 of the feeding device 4 is directed towards the drum conveyor 5. The feeding device 4 is composed of a first feeding channel 10, a second feeding channel 11 and a third feeding channel 12, whereas the outlet 8 is simultaneously an outlet of the second feeding channel 11. The successively flow-connected third feeding channel 12, first feeding channel 10 and second feeding channel 11 are adapted to feed the rod-like articles 2 in the form of a mass flow MF, i.e. a multi-layer stream of the rod-like articles 2, whereas the first feeding channel 10 and the third feeding channel 12 are adapted to feed the rod-like articles under the force of gravity, whereas in the second feeding channel 11 the flow of the rod-like articles 2 is forced by the conveyors 16, 17 from the inlet 9 of the second feeding channel 11 to the outlet 8. The outlet 8 is situated at the side under the storage container 3 and is connected with an inlet mouth 3A of the storage container 3. The first feeding channel 10 may be situated vertically or may be away from the vertical as shown in FIG. 1. The connection 13 of the first feeding channel 10 and the third feeding channel 12 has the shape of an arc and is provided with a roller 14 whose lateral surface 14A constitutes an internal wall of the arc-shaped connection 13, while the also arc-shaped wall 13A constitutes an external wall of the connection 13. The roller 14 is rotatably mounted, is not driven and rotates under the influence of the mass flow MF of the rod-like articles 2, whereas the application of the roller 14 facilitates the flow because the rod-like articles 2 do not rub against the immovable wall so that the pressures among the rod-like articles 2 in the mass flow MF on the inside of the connection 13 are reduced. In the case of the rod-like articles 2 with a high friction coefficient of the wrapping material relative to the feeding channel walls and relative to the same material, preferably a roller, which is driven and will facilitate the mass flow, may be applied. In addition, the third feeding channel 12 is provided with a vibration element 12B mounted on the wall 12A, for example a pneumatic vibration element which facilitates the movement of the rod-like articles 2 along the third feeding channel 12. In the embodiment shown, the first feeding channel 10 is fed from the third feeding channel 12 which is fed from a not shown source. The first feeding channel 10 may be fed in any other way, for example by means of a conveyor situated horizontally, whereas at the connection of such conveyor and the first feeding channel 10 an intermediate store may be situated. The connection 15 of the first feeding channel 10 and the second feeding channel 11 is arc-shaped, the arched end-piece 10B of the wall 10A constitutes an external wall of the connection 15. The second feeding channel 11 is provided with two conveyors, a lower conveyor 16 and an upper conveyor 17, which constitute drive elements for the mass flow MF. The lower conveyor 16 is situated substantially horizontally, whereas it may be situated at an angle to the level. One of the rollers 18, 19 of the lower conveyor 16 may be a drive roller, whereas for the sake of simplicity the drive mechanism was not shown in the drawing. The upper conveyor 17 is situated at an angle α to the lower conveyor 16, whereas the angle α between the bearing surface 17A of the belt 17B and the bearing surface 16A of the belt 16B ranges between 0° and 5°, preferably the angle α is 3° for which a correct operation of the feeding apparatus 1 for various rod-like articles 2 was achieved. In order to obtain a suitable inclination angle, it is possible to adjust the position of each of the rollers 20, 21 in the up-down direction, which was marked by arrows, or of only one of them. One of the rollers 20, 21 may be a drive roller, whereas the drive mechanism is common for the conveyors 16 and 17 so as to synchronise the movement of both conveyors and to obtain the same speeds for both conveyors 16, 17. In order to set the angle α, it is possible to adjust the position of the rollers 20, 21 on an arc, for example if the roller 21 is a drive roller, then the position of the roller 20 may be adjusted on an arc so that the centre of the arc is situated in the axis of rotation of the roller 21. In the second feeding channel 11, the distance between the bearing surface 16A of the belt 16B and the bearing surface 17A of the belt 17B on the side of the first feeding channel 10 differs from the distance between these belts at the outlet 8 of the second feeding channel 11. The inlet width $d2$ of the second feeding channel 11 on the side of the first feeding channel 10 is similar to the width $d1$ of the first feeding channel 10. The lower conveyor 16 and the upper conveyor 17 are situated convergently in the direction from the first feeding channel 10 to the storage container 3 so that the outlet width $d3$ of the second feeding channel 11 on the side of the outlet 8 is smaller than the inlet width $d2$. It is possible to obtain such relationship between the channel widths 10 and 11 that $d3<d2>d1$ or $d3<d2=d1$. The width $d4$ of the inlet mouth 3A of the storage container 3 i.e. the distance between the bearing surface 5A of the drum conveyor 5 and the bearing surface 17A of the drive element 17, namely between the vertices of projections 22 between the grooves 23 on the drum conveyor 5 and the bearing surface 17A of the belt 17B, is greater than the inlet width $d2$ and the outlet width $d3$ of the second feeding channel 11 as well as the width $d1$ of the first feeding channel 10. As a result, loosening of the rod-like articles 2 in the storage container 3 is achieved, which facilitates the filling of successive grooves 23 on the drum conveyor 5. The third feeding channel 12 may have any width $d5$, whereas in view of the fluency of operation of the feeding device 4 preferably the width $d5$ of the third feeding channel 12 is equal to the width $d1$ of the first feeding channel 10 so that a steady flow in the feeding device 4 may be achieved. The width $d6$ of the third feeding channel 12 may be equal to or smaller than the width $d5$. If the width $d5$ is slightly smaller than the width $d1$, an advantageous effect consisting in a loosened mass flow MF and a local reduction of pressures among the rod-like articles 2 in the mass flow MF is achieved. The reduction of pressures among the rod-like articles 2 allows removing the gaps which may appear in the mass flow MF and which interrupt the continuity of layers of the rod-like articles; after the removal of gaps, the arrangement of the rod-like articles 2 in the mass flow becomes similar to a hexagonal arrangement, i.e. a honeycomb-like structure. In the case of rod-like articles with a low friction coefficient of the wrapping material, preferably the width of the feeding channels decreases from the inlet of the feeding device 4 right to the outlet 8 so that $d6>d5>d2>d3$.

During the rotational movement of the drum conveyor 5, all grooves 23 are being filled. The storage container 3 is provided with a pushing roller 24 adapted to push the overflow of the rod-like articles 2 so that these articles are not squeezed. The rod-like articles 2 are conveyed in the form of a single-layer stream SF in the grooves 23 on the bearing surface 5A of the drum conveyor 5. In the embodiment shown, the drum conveyor 5 is provided with a casing 25 and with circular knives 26 adapted to cut the rod-like articles 2 into shorter sections, whereas the circular knives 26 are situated in slots in the casing 25.

The storage container 3 is provided with a sensor 27 adapted to measure the filling level of the storage container 3, for example an optical or ultrasonic sensor. With a broken line L, an example of the storage container 3 filling was marked, i.e. a line drawn tangentially to the uppermost rod-like articles 2 being in the storage container 3. The feeding apparatus 1 is provided with a control system 28 which receives a signal of the rotational speed of the drum conveyor 5, of the mass flow speed v in the second feeding channel 11 substantially corresponding to the speed of the conveyors 16 and 17, and of the storage container 3 filing level L. The control system 28 controls the rotational speed of the drum conveyor 5 and the speed of the lower 16 and upper conveyors 17 depending on the demand for the rod-like articles 2 in a receiving apparatus (not shown).

During the operation of the feeding apparatus 1, the rod-like articles 2 move in the form of the mass flow MF through the third feeding channel 12, then through the first feeding channel 10, whereas a constant width of the mass flow MF is substantially maintained. The rod-like articles 2 flow into the second feeding channel 11, whereas the arched shape of the connection 15 facilitates forming the same number of layers of the rod-like articles 2 in the second feeding channel 11 without gaps among the rod-like articles 2. The width of the mass flow MF in the second feeding channel is reduced so that a compression of the rod-like articles 2 is introduced. The rod-like articles 2 flow into the storage container 3 and in the course of rotation of the drum conveyor 5 fall into the grooves 23 of such conveyor. Correspondingly to the capacity of the receiving apparatus for receiving the single-layer stream SF, the drum conveyor 5 has a given rotational speed, and the rod-like articles 2 in the second feeding channel 11 of the feeding device 4 have a given speed v of the mass flow MF, with a mathematical relationship between the speed v of the second feeding channel 11 and the rotational speed $\omega$ of the drum conveyor 5 being determined. The compression given to the rod-like articles stabilizes the efficiency of feeding of the rod-like articles 2 from the feeding device 4, i.e. a displacement of the rod-like articles 2 relative to one another does not occur and the mass flow speed is the same as the speed of the conveyors 16, 17, which is very important in the case of rod-like articles whose wrapping material has a low friction coefficient. However, in view of the possibility that not all grooves 23 are filled and of unavoidable deviations from the nominal efficiency of rod-like articles 2 feeding by the feeding device 4, the storage container 3 filling level L may vary. A deviation from the nominal efficiency is influenced by the wrapping material friction coefficient, the article shape defects, the article mass and variable pressures coming from the article column before and behind the second feeding channel. The control system 28 allows controlling and maintaining a certain filling level L as expected level, and adjusting the speed of the drum conveyor 5 and of the conveyors 16, 17 in the feeding device 4; in the case of a decrease of the filling level L below the expected level, the speed v will be temporarily increased correspondingly to the actual rotational speed $\omega$ of the drum conveyor 5, and if it is necessary to repeat the increase of the speed v, the mathematical relationship between the speeds $\omega$ and v is to be changed. In the case of an increase of the filling level L above the expected level, the speed v will be temporarily reduced correspondingly to the actual rotational speed $\omega$ of the drum conveyor 5, and if it is necessary to repeat the increase of the speed v, the mathematical relationship between the speeds $\omega$ and v is to be changed. The expected filling level L is for example such level where the maximum filling of the grooves 23 of the drum conveyor 5 is achieved or such level where the rod-like articles 2 are subject to minimum damage. The control system 28 will stop the feeding device 4 when the quantity of the rod-like articles 2 in the container 3 reaches the maximum level (in FIG. 2 an example of the maximum filling level L was shown). If the quantity of the rod-like articles falls to zero, the apparatus receiving the rod-like articles 2 will be stopped. The operator control panel should allow setting the minimum and maximum levels in the storage container as well as the expected storage container filling level, and in addition the factor of proportionality of the feeding speed v relative to the rotational speed ω.

The feeding apparatus 1 allows complete emptying of the storage container 3 without the need to empty the feeding device 4. In the embodiment shown, the feeding device 4 is provided with three feeding channels 10, 11, 12, whereas the width of the flow formed there is reduced at the outlet of the second feeding channel 11. After stopping the lower conveyor 16 and the upper conveyor 17 of the second feeding channel 11 (for example manually), the mass flow MF in the feeding device 4 is stopped, during the operation of the drum conveyor 5 the storage container 3 will be completely emptied of the rod-like articles 2 because it is not possible that with the introduced compression the rod-like articles 2 automatically get out of the second feeding channel 11.

Figure 3:
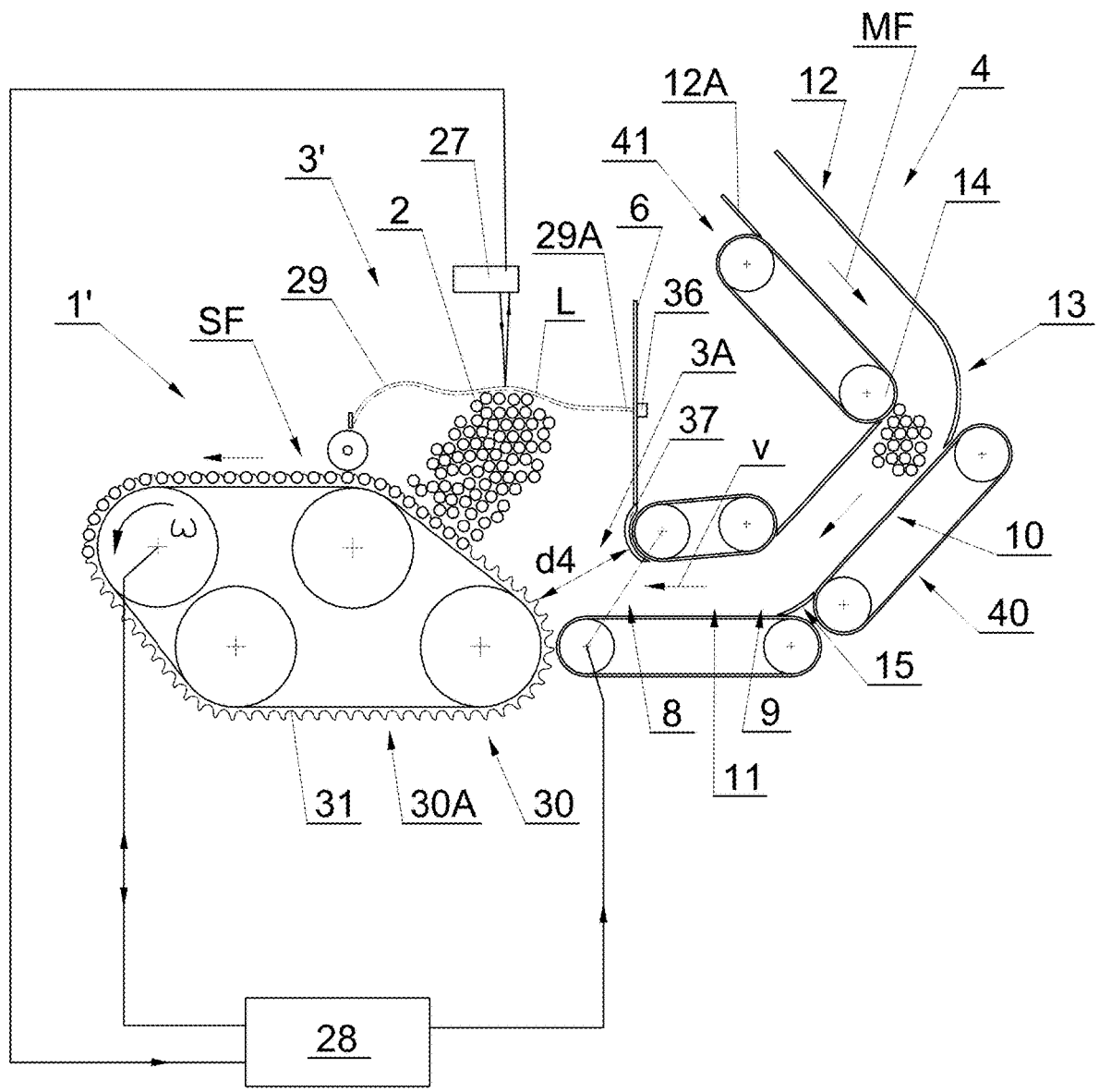
FIG. 3 shows the feeding apparatus in a front view in an embodiment with a belt conveyor and a flexible wall stabilizing the upper layer of rod-like articles in a storage container.

The feeding apparatus 1' in the second embodiment shown in FIG. 3 comprises the storage container 3' provided with a flexible wall 29 which serves as an element stabilizing the upper layer of the rod-like articles 2 collected in the storage container 3. The flexible wall 29, for example a metal net, is adapted to adjust its shape to the shape of the upper layer of the rod-like articles 2 in the storage container 3, the flexible wall 29 takes the shape of the uppermost layer of the rod-like articles 2. The flexible wall 29 protects the rod-like articles 2 against a free movement in the left-right direction in the drawing plane and against accidental crossing of the articles 2 resulting in a disturbed operation of the apparatus. The end-piece 29A of the flexible wall 29 may be fastened at any height by means of a fastening element 36 or the position of the end-piece 29A may be forced by the amount of the rod-like articles 2 collected in the storage container 3, i.e. correspondingly to the filling level L. The end-piece 29A of the flexible wall 29 may be fastened by means of a spring outside the area of the storage container 3. The flexible wall 29 may take the position right next to the bearing surface 5A, 30A for the minimum quantity of the rod-like articles 2 in the storage container 3. With an increasing quantity of the rod-like articles 2 in the storage container 3, the flexible wall 29 takes an increasingly higher position right up to the maximum position determined by the maximum quantity of the rod-like articles 2 which may be collected in the storage container 3. If the storage container 3 is emptied of the rod-like articles 2, the flexible wall 29 may abut on the bearing surface 5A, 30A. In the embodiment shown, underneath the wall 6 of the storage container 3 there is situated a covering element 37 being an extension of the wall 6 and separating the rod-like articles 2 in the storage container 3 from the upper conveyor 17. Due to the application of the covering element 37, the operation of the upper conveyor 17 does not influence the movement of the rod-like articles 2 in the storage container 3, especially as in this area the rod-like articles 2 may move downwards in the direction of the inlet mouth 3A. In this case, the width d4 of the inlet mouth 3A is measured from the bearing surface 30A of the conveyor 30 to the covering element 37. The feeding device 4 is provided with additional conveyors. The first feeding channel is provided with the conveyor 40 situated between the connection 13 and the connection 15. The third feeding channel 12 is provided with the conveyor 41 situated above the connection 13. The feeding device 4 may be provided with only one of the conveyors 40, 41, it is also possible to use the conveyors on both sides of the channels 10, 12 similar to the second feeding channel 11. The feeding apparatus 1' is provided with the belt conveyor 30 having the bearing surface 30A provided with the grooves 31. The belt conveyor 30 may be replaced with a chain conveyor.

Figure 4:
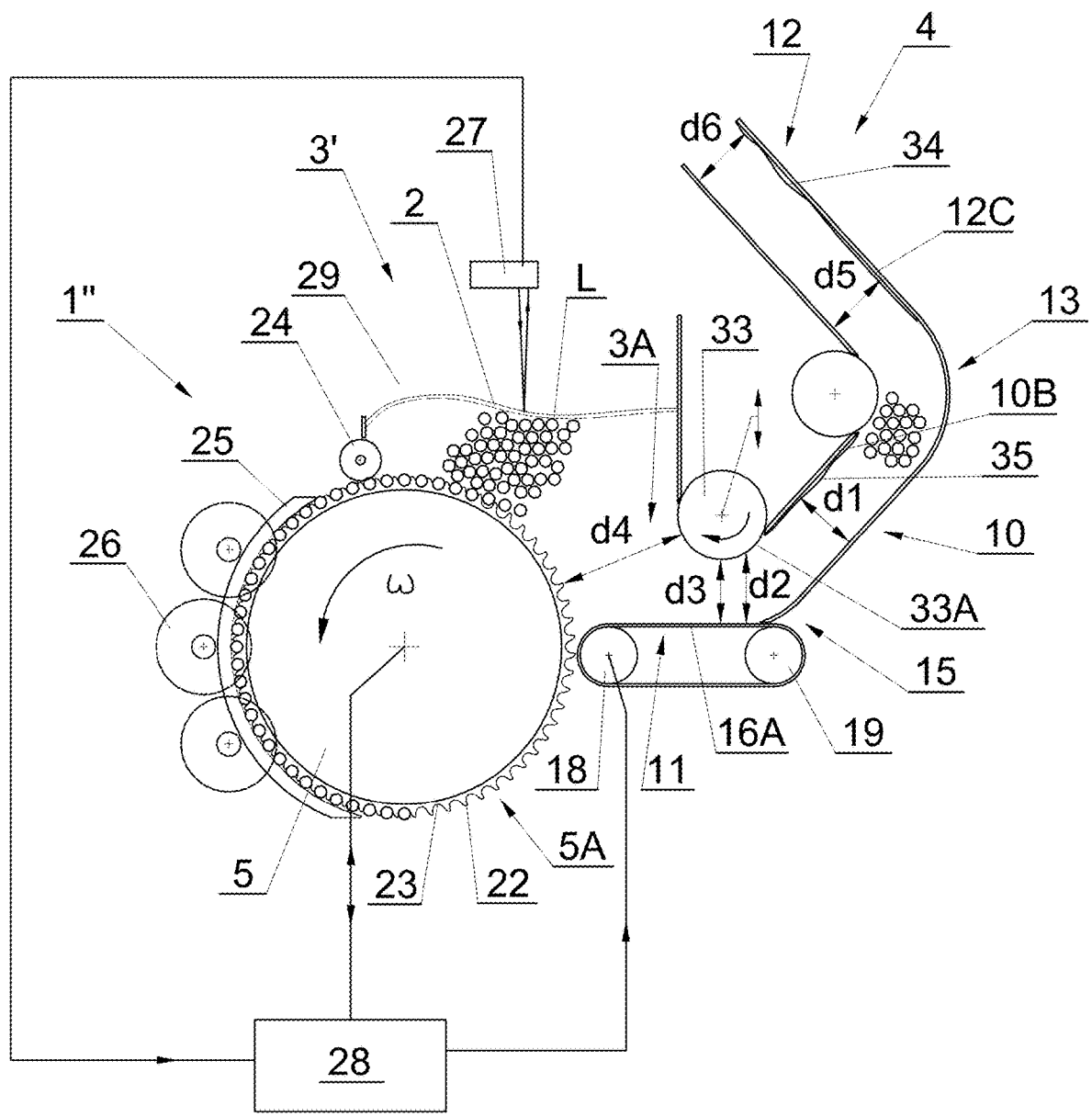
FIG. 4 shows the feeding apparatus in a front view in an embodiment with the drum conveyor and an upper drive element in the form of a roller.

The feeding apparatus 1" in the third embodiment shown in FIG. 4 comprises the storage container 3' as in the second embodiment and the drum conveyor 5 as in the first embodiment, and also the feeding device 4' whose second feeding channel 12 is provided with the lower conveyor 16 and the upper drive element for the mass flow MF in the form of a roller 33. The lower fragment of the circumferential surface 33A on the side of the mass flow at the connection 15 is situated convergently to the belt of the lower conveyor 16, in the area of the connection 15 the mass flow MF has the width d2 in relation to the lower conveyor 16, the smallest width of the mass flow MF being defined by the width d3. In the feeding device 4, the width d6 of the third feeding channel 12 at the beginning of that channel is smaller than the width d5 before the connection 13, whereas the third feeding channel 12 is provided with a flexible element 34 next to the wall 12C whose task is to exert a gentle pressure on the rod-like articles 2. As a result, the pressures among the rod-like articles are reduced, and it is easier to remove the gaps and to form the mass flow layers. Similarly, the first feeding channel 10 is provided with the flexible element 35 next to the wall 10B having the same function as the flexible element 34.

Figure 5:
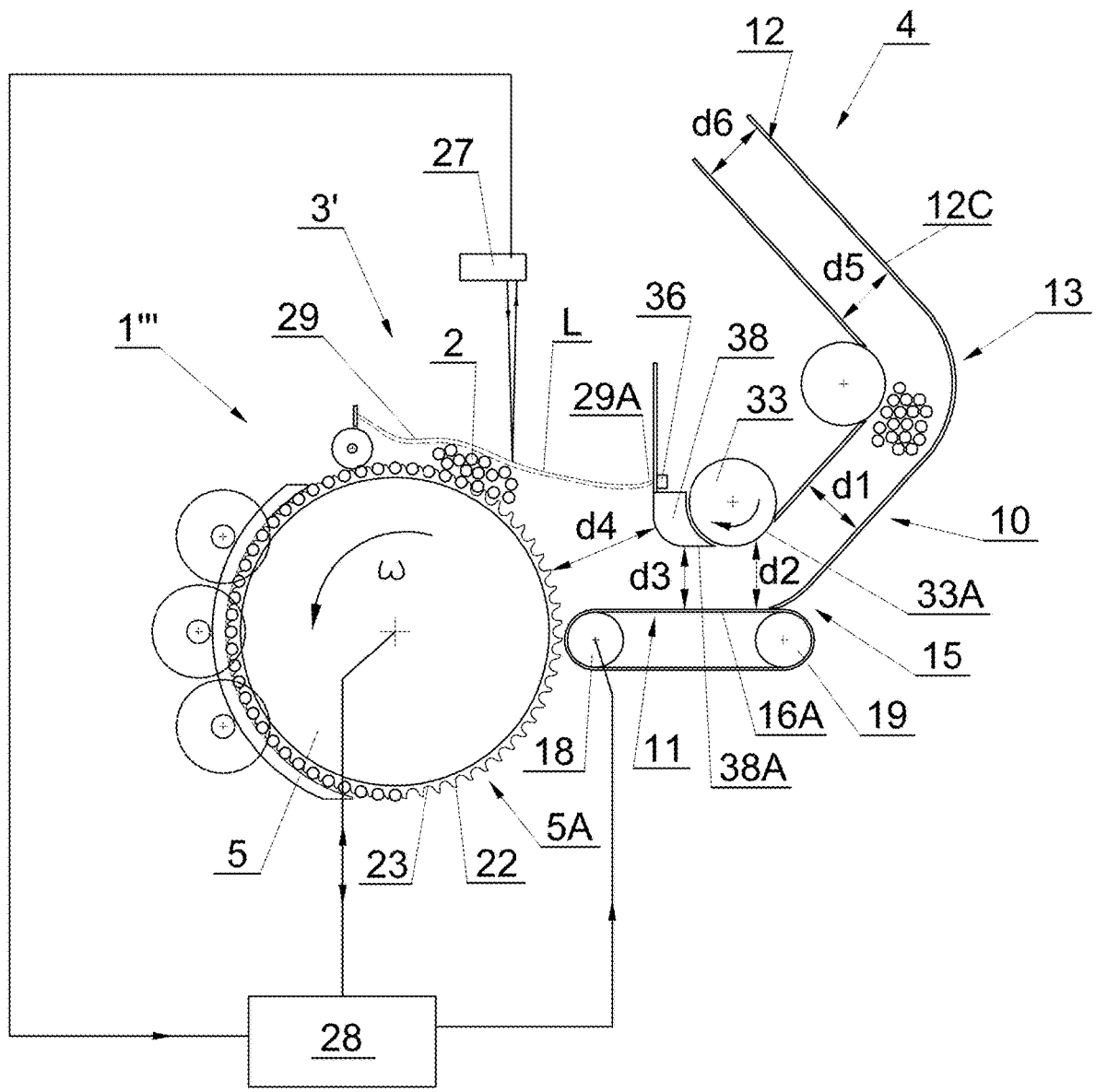
FIG. 5 shows the feeding apparatus in a front view in an embodiment with the drum conveyor, the upper drive element in the form of the roller and a covering element.

In the embodiment of the apparatus 1''' shown in FIG. 5, underneath the wall 6 next to the roller 33 there is situated the covering element 38 which separates the rod-like articles 2 in the storage container from the roller 33. The lower surface 38A constitutes the upper wall of the second feeding channel 11, whereas the width d3 of the second feeding channel 11 under the covering element 38 is smaller than the inlet width d2 on the side of the first feeding channel 10. The position of the covering element 38 may be adjusted in the vertical direction. In FIG. 5, there was shown a very low filling level L which may be the expected filling level in the case of rod-like articles with a relatively great mass. The flexible wall 29 is situated close to the bearing surface 5A of the drum conveyor 5, for example at the distance of two diameters of the rod-like articles 2.

Preferably, according to the invention, in the storage container 3 there are no further conveyors or guiding structures which would influence the direction of flow of the rod-like articles inside the storage container 3. It can be said that the storage container 3 is empty inside. The mass flow inside the storage container 3 is subject to a natural arrangement under the influence of initial conditions, i.e. of the method of insertion of the mass flow MF into the storage container 3, the force of gravity, the action of the flexible wall 29 and the movement of the bearing surface 5A, 30A of the outlet conveyor. The initial conditions and the parameters at which the mass flow is inserted into the storage container, i.e. in the form of a lateral flow through the second feeding channel 11 provided with the upper drive element 17 and the lower conveyor 16, make it possible to remove further elements influencing the flow from the inside of the storage container.

Furthermore, such mutual arrangement of the flexible wall 29 and the feeding channel 11 that the areas of their action are in contact but do not overlap makes it possible to optimally use the entire volume of the storage container 3 for the storage of the rod-like articles, and as a result of a better use of the volume to reduce the dimensions of the apparatus or to increase its efficiency.

The invention claimed is:

1. A feeding apparatus for feeding a single-layer stream of tobacco industry's rod-like articles (2) comprising
a first feeding channel (10) adapted to convey the rod-like articles (2) in the form of a mass flow (MF);
a second feeding channel (11) provided with a lower conveyor (16), adapted to convey the rod-like articles (2) in the form of the mass flow (MF), whereas the second feeding channel (11) is flow-connected with the first feeding channel (10);
a storage container (3) adapted to filling with the rod-like articles (2), flow-connected with the second feeding channel (11);
an outlet conveyor (5, 30) provided with a bearing surface (5A, 30A) comprising grooves (23, 31), adapted to take the rod-like articles (2) from the storage container (3) and convey the rod-like articles (2) in the form of a single-layer stream (SF) of rod-like articles (2);
characterised in that
the bottom of the storage container (3) is formed by the lower conveyor (16) of the second feeding channel (11) and the bearing surface (5A, 30A) of the outlet conveyor (5, 30);
the second feeding channel (11) is provided with an upper drive element (17, 33) for the mass flow (MF) comprising a bearing surface (17A, 33A) which is at least partially situated convergently to the bearing surface (16A) of the lower conveyor (16) of the second feeding channel (11) in the direction from the first feeding channel (10) to the storage container (3).

2. The apparatus as in claim 1, characterised in that the inlet width (d2) of the second feeding channel (11) at the connection (15) of the first feeding channel (10) and the second feeding channel (11) is equal to or greater than the width (d1) of the first feeding channel (10).

3. The apparatus as in claim 1, characterised in that the width (d4) of an inlet mouth (3A) of the storage container (3) is greater than the inlet width (d2) of the second feeding channel (11) or the outlet width (d3) of the second feeding channel (11).

4. The apparatus as in claim 1, characterised in that the upper drive element is an upper conveyor (17) having two rollers (20, 21) whose bearing surface (17A) is situated at an angle (α) to the lower conveyor (16) ranging between 0° and 5° so that the outlet width (d3) is smaller than or equal to the inlet width (d2) of the feeding channel (11).

5. The apparatus as in claim 1, characterised in that the upper drive element is a roller (33).

6. The apparatus as in claim 1, characterised in that the outlet conveyor (5) is a drum conveyor (5).

7. The apparatus as in claim 1, characterised in that the outlet conveyor (30) is a belt or chain conveyor.

8. The apparatus as in claim 1, characterised in that the bearing surface (17A, 33A) of the upper drive element (17, 33) is adapted to move with a speed equal to the speed of the lower conveyor (16).

9. The apparatus as in claim 1, characterised in that the apparatus is provided with a third feeding channel (12) which is flow-connected with the first feeding channel (10) and the first feeding channel (10) and/or the third feeding channel (12) is adapted to convey the rod-like articles (2) under the force of gravity.

10. The apparatus as in claim 9, characterised in that the first feeding channel (10) and/or the third feeding channel (12) is adapted to convey the rod-like articles (2) by means of a conveyor (40, 41).

11. The apparatus as in claim 9, characterised in, the connection of the third feeding channel (12) and the first feeding channel (10) is provided with a roller (14) whose circumferential surface (14A) constitutes a wall for the mass flow (MF).

12. The apparatus as in claim 4, characterised in that the roller (20) on the side of the storage container (3) is adapted to change the position in the transverse direction to the second feeding channel (11).

13. The apparatus as in claim 1, characterised in that the first feeding channel (10) and/or the third feeding channel (12) is provided with a flexible element (34, 35) situated at the wall (10B, 12C) of that channel.

14. The apparatus as in claim 1, characterised in that at the upper drive element (17, 33) on the side of the storage container (3) a covering element (37, 38) is situated.

15. The apparatus as in claim 1, characterised by being provided with a sensor (27) adapted to measure the level (L) of storage container (3) filling with the rod-like articles (2) situated in the upper part of the storage container (3).

16. The apparatus as in claim 1, characterised in that the storage container (3) is provided with a flexible wall (29) adapted to adjust its shape to the shape of the upper layer of the rod-like articles (2) collected in the storage container (3).

17. The apparatus as in claim 1, characterised by being provided with a controller to control the storage container (3) filling level (L), adjust the mass flow (MF) speed (v) in the second feeding channel (11) depending on the filling level (L) and on the outlet conveyor (5, 30) speed (w), and to determine dependencies between the speeds.

* * * * *